United States Patent
Freeman et al.

(10) Patent No.: US 11,230,937 B2
(45) Date of Patent: Jan. 25, 2022

(54) TURBINE SHROUD ASSEMBLY WITH DOVETAIL RETENTION SYSTEM

(71) Applicants: Rolls-Royce North American Technologies, Indianapolis, IN (US); Rolls-Royce Corporation, Indianapolis, IN (US); Rolls-Royce plc

(72) Inventors: Ted J. Freeman, Danville, IN (US); Aaron D. Sippel, Danville, IN (US); Alexandra Baucco, Indianapolis, IN (US); Anthony Razzell, London (GB); Michael J. Whittle, London (GB); Jeffrey Crutchfield, Long Beach, CA (US)

(73) Assignees: Rolls-Royce North American Technologies Inc., Indianapolis, IN (US); Rolls-Royce Corporation, Indianapolis, IN (US); Rolls-Royce plc

( * ) Notice: Subject to any disclaimer, the term of this patent is extended or adjusted under 35 U.S.C. 154(b) by 0 days.

(21) Appl. No.: 16/876,852

(22) Filed: May 18, 2020

(65) Prior Publication Data

US 2021/0355835 A1 Nov. 18, 2021

(51) Int. Cl.
*F01D 11/08* (2006.01)
*F01D 9/04* (2006.01)
*F01D 25/24* (2006.01)

(52) U.S. Cl.
CPC .......... *F01D 9/042* (2013.01); *F01D 25/246* (2013.01); *F05D 2220/32* (2013.01); *F05D 2230/64* (2013.01); *F05D 2240/12* (2013.01)

(58) Field of Classification Search
CPC ........ F01D 11/08; F01D 11/005; F01D 25/24; F01D 25/246; F01D 25/26; F01D 25/28; F05D 2240/11; F05D 2300/6033
See application file for complete search history.

(56) References Cited

U.S. PATENT DOCUMENTS

| | | | |
|---|---|---|---|
| 6,733,235 B2 | 5/2004 | Alford et al. | |
| 7,052,235 B2 * | 5/2006 | Alford | F01D 9/04 415/173.1 |
| 9,039,358 B2 | 5/2015 | Tholen et al. | |
| 9,458,726 B2 | 10/2016 | Lamusga et al. | |
| 9,759,082 B2 | 9/2017 | Thomas et al. | |
| 9,938,846 B2 * | 4/2018 | Freeman | F01D 5/14 |
| 10,030,541 B2 | 7/2018 | Vetters et al. | |
| 10,309,257 B2 | 6/2019 | Sippel et al. | |
| 10,364,693 B2 | 7/2019 | Thomas et al. | |
| 2011/0236203 A1 * | 9/2011 | Arilla | F01D 11/005 415/213.1 |
| 2016/0333715 A1 | 11/2016 | McCaffrey | |
| 2018/0156068 A1 * | 6/2018 | Roussille | F01D 25/005 |
| 2018/0306045 A1 | 10/2018 | Barrett et al. | |
| 2019/0107001 A1 * | 4/2019 | Crutchfield | F01D 25/246 |

* cited by examiner

*Primary Examiner* — Woody A Lee, Jr.
*Assistant Examiner* — Maxime M Adjagbe
(74) *Attorney, Agent, or Firm* — Barnes & Thornburg LLP

(57) ABSTRACT

A turbine shroud assembly for use with a gas turbine engine includes a turbine outer case, a blade track segment, and a carrier. The turbine outer case is arranged circumferentially around an axis. The blade track segment includes an arcuate runner that extends circumferentially partway around the axis to define a gas path boundary of the turbine shroud assembly and an attachment feature that extends radially outward from the runner. The carrier is configured to couple the blade track segment to the turbine outer case.

16 Claims, 9 Drawing Sheets

TURBINE SHROUD ASSEMBLY WITH DOVETAIL RETENTION SYSTEM

FIELD OF THE DISCLOSURE

The present disclosure relates generally to gas turbine engines, and, specifically, to turbine shroud assemblies for use in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from materials that have different coefficients of thermal expansion. Due to the differing coefficients of thermal expansion, the components of some turbine shrouds expand at different rates when exposed to combustion products. In some examples, coupling such components with traditional arrangements such as rivets or bolts may not allow for the differing levels of expansion and contraction during operation of the gas turbine engine.

SUMMARY

The present disclosure may comprise one or more of the following features and combinations thereof.

A turbine shroud assembly for use with a gas turbine engine includes a turbine outer case, a blade track segment, and a carrier assembly. The turbine outer case is arranged circumferentially around an axis. The blade track segment includes an arcuate runner and an attachment feature. The arcuate runner extends circumferentially partway around the axis to define a gas path boundary of the turbine shroud assembly. The attachment feature that extends radially outward from the runner and the attachment feature includes radially inward facing and angled load surfaces and a radially outward facing locating surface.

The carrier assembly is configured to couple the blade track segment to the turbine outer case. The carrier assembly includes a first carrier segment and a second carrier segment. The first carrier segment shaped to have (i) a first radially-extending flange that extends radially inwardly from the turbine outer case and (ii) a first load carrying portion that engages a first one of the radially inwardly facing and angled load surfaces provided by the attachment feature included in the blade track segment. The second carrier segment shaped to have (i) a second radially-extending flange that extends radially inwardly from the turbine outer case and (ii) a second load carrying portion that engages a second one of the radially inwardly facing and angled load surfaces provided by the attachment feature included in the blade track segment.

In some embodiments, the second carrier segment further includes an outer wall. The outer wall has a locating pad that extends radially inward from a radially inward surface of the outer wall into contact with the radially outward facing locating surface provided by the attachment feature included in the blade track segment so as to radially locate the blade track segment upon pressing of the second carrier segment toward the first segment causing the angled load surfaces included in the attachment feature of the blade track segment to be pushed radially outward.

In some embodiments, the radially inward facing and angled load surfaces extend axially and radially relative to the axis so as to form a dovetail shape when viewed circumferentially about the axis. In some embodiments, the first load carrying portion includes a main boom that extends from the first radially-extending flange and at least one load pad that extends from the main boom into engagement with the load surfaces of the attachment feature.

In some embodiments, the locating pad of the second carrier segment and the locating surface of the attachment feature are linear surfaces tangential to the axis.

In some embodiments, the forward hanger engages the forward extending flange to push the first carrier segment axially aft. The aft hanger engages the forward flange of the second carrier segment to push the second carrier segment axially forward. An axial assembly gap between the first carrier segment and the second carrier segment is closed upon assembly.

In some embodiments, the turbine shroud assembly further includes a locating spacer. The locating spacer includes an inwardly facing locating pad that engages the locating surface of the attachment feature to radially location the blade track segment. In some embodiments, the locating spacer is coupled to the forward extending flange of the first carrier segment and the aft flange of the second carrier segment.

In some embodiments, the turbine shroud assembly further includes one of a bias member and a seal. The bias member or seal located radially between and engaging the second carrier segment and the locating surface included in the attachment feature of the blade track segment.

According to another aspect of the present disclosure, a turbine shroud assembly for use with a gas turbine engine includes a turbine outer case, a carrier assembly, and a blade track segment. The turbine outer case including a forward outer case and an aft outer case. The forward outer case including a forward outer wall, a forward mount flange extending radially outward from the outer wall at an aft terminating end of the forward outer wall, and a radially inward extended forward hanger. The aft outer case including an aft outer wall, an aft mount flange extending radially outward from the aft outer wall at a forward terminating end of the aft outer wall, and a radially inward extending aft hanger.

The carrier assembly is made of metallic material and arranged circumferentially around an axis. The carrier assembly includes a forward carrier segment and an aft carrier segment, the forward carrier segment includes a forward radially extending flange that couples with the forward hanger and a forward load carrying portion that extends axially aft from an inner end of the forward extending flange. The aft carrier segment includes a forward flange that couples with the aft hanger, an outer wall that extends axially aft from the forward flange, an aft flange that extends radially inward from an aft end of the outer wall, and an aft load carrying portion that extends axially forward from an inner end of the aft flange.

The blade track segment is made of ceramic matrix composite materials. The blade track segment includes an arcuate runner that extends circumferentially partway around an axis to define a gas path boundary of the turbine shroud assembly and an attachment feature that extends radially outward from the runner to couple with the carrier assembly. The attachment feature includes radially inward facing and angled load surfaces that engage the forward load carrying portion of the forward carrier segment and the aft load carrying portion of the aft carrier segment, and a radially outward facing locating surface.

The forward carrier segment and the aft carrier segment urge the angled load surfaces to be pushed radially outward by the forward and aft load carrying portions, resulting in the locating surface of the attachment feature to bias towards the outer wall of the aft carrier segment thereby radially locating the blade track segment relative to the carrier assembly. The forward carrier segment and the aft carrier segment are clamped together in compression so that the blade track segment does not move radially relative to the axis in response to thermal growth of the turbine shroud assembly.

In some embodiments, the aft carrier segment includes a locating pad that extends radially inward from the outer wall and engages the locating surface of the attachment feature. The locating pad of the aft carrier segment and the locating surface of the attachment feature are linear surfaces tangential to the axis.

In some embodiments, the forward load carrying portion includes forward load pads. The aft load carrying portion includes aft load pads. The forward load pads and aft load pads engage the load surfaces of the attachment feature.

In some embodiments, the forward hanger engages the forward extending flange to push the forward carrier segment axially aft. The aft hanger engages the forward flange of the aft carrier segment to push the aft carrier segment axially forward such that an axial assembly gap between the forward carrier segment and the aft carrier segment is closed upon assembly.

In some embodiments, the turbine shroud assembly includes a locating spacer. The locating spacer includes an inwardly facing locating pad that engages the locating surface of the attachment feature to radially locate the blade track segment relative to the axis. In some embodiments, the locating spacer is coupled to the forward extending flange of the forward carrier segment and the aft flange of the aft carrier segment.

In some embodiments, the turbine shroud assembly includes a rope seal. The rope seal is located radially between and engages the radially outward facing locating surface and the outer wall.

In some embodiments, the turbine shroud assembly includes a bias member. The bias member is located radially between and engages the radially outward facing locating surface and the outer wall.

According to an aspect of the present disclosure, a method includes a number of steps. The method may include providing a turbine outer case arranged circumferentially around an axis, a blade track segment, and a carrier, the turbine outer case having a first case and a second case, the blade track segment including an arcuate runner that extends circumferentially partway around the axis and an attachment feature that extends radially outward from the runner, the attachment feature includes radially inward facing and angled load surfaces, and the carrier including a first carrier segment and a second carrier segment, aligning the attachment feature of the blade track segment with the first carrier segment and the second carrier segment, moving the first carrier segment and the second carrier segment relative to each other to trap the attachment feature between the first carrier segment and the second carrier segment so that load carrying portions included in the first carrier segment and the second carrier segment engage the radially inward facing and angled load surfaces of the attachment feature and move the radially inward facing and angled load surfaces radially outward, aligning the first case and the second case with flanges of the carrier, and moving the first case and the second case relative to each other to trap the flanges of the carrier between the first case and the second case so that the carrier is supported by the turbine outer case.

In some embodiments, the method includes locating one of a spacer, bias member, and seal between the attachment feature and the second carrier segment before the step of moving the first carrier segment and the second carrier segment. In some embodiments, the method includes compressing the attachment feature radially between the first carrier segment and the second carrier segment.

These and other features of the present disclosure will become more apparent from the following description of the illustrative embodiments.

DETAILED DESCRIPTION OF THE DRAWINGS

Figure 1:
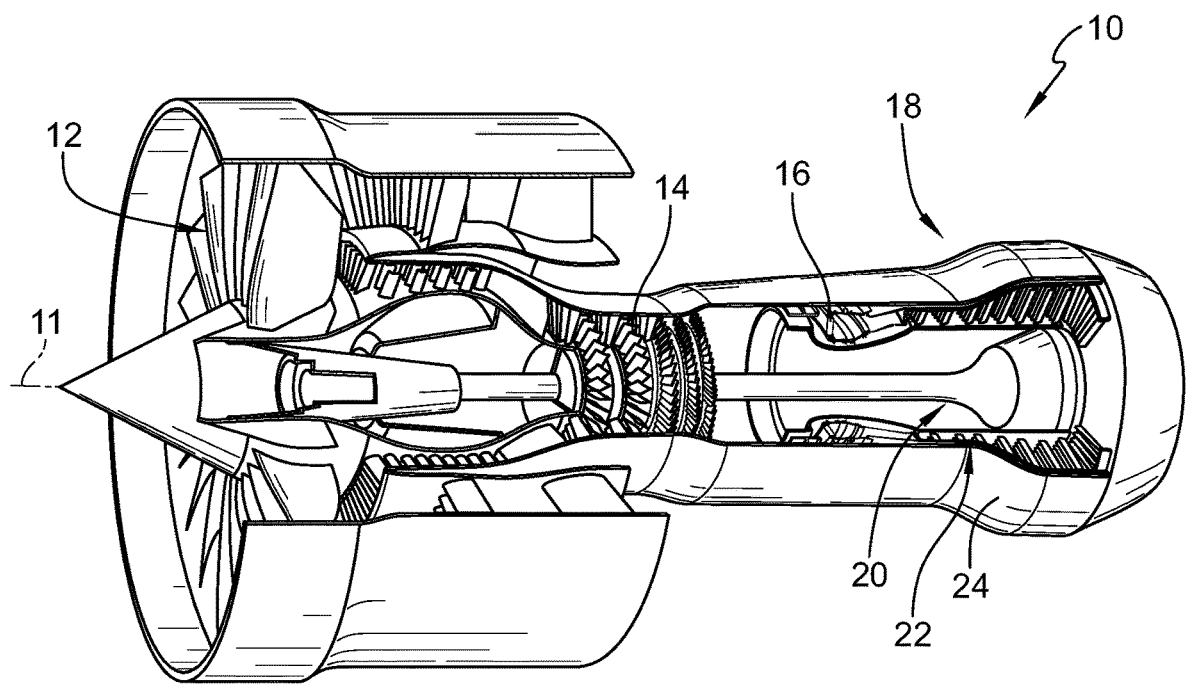
FIG. 1 is a cutaway perspective view of a gas turbine engine that includes a fan, a compressor, a combustor, and a turbine, the turbine includes a turbine shroud assembly that extends circumferentially around an axis of the engine and circumferentially around a turbine wheel that is driven to rotate about the axis of the engine to generate power.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 11 and drive the compressor 14 and the fan 12. In some embodiments, the fan may be replaced with a propeller, drive shaft, or other suitable configuration.

Figure 2:
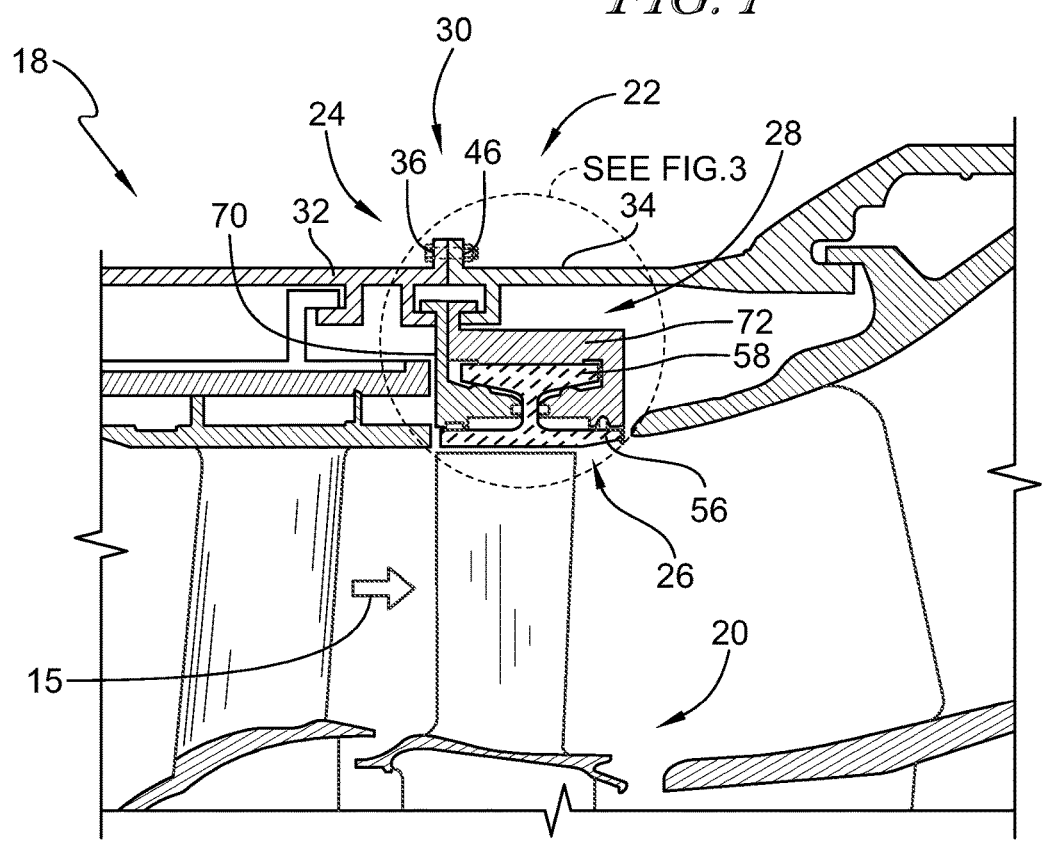
FIG. 2 is a cross-sectional view of a portion of the turbine included in the gas turbine engine of FIG. 1 showing one of the turbine wheel assemblies and the turbine shroud arranged around the turbine wheel assembly, the turbine shroud including a blade track segment with a dovetail attachment feature and a carrier assembly comprising a forward segment and aft carrier segment, wherein the forward and aft carrier segments create a dovetail cavity that receives the dovetail attachment feature of the blade track segment.

The turbine 18 includes a turbine wheel assembly 20 and a turbine shroud assembly 22 positioned to surround the turbine wheel assembly 20 as shown in FIGS. 1 and 2. The turbine shroud assembly 22 extends circumferentially about the engine axis 11 and defines a gas path 15 outer boundary through which hot, high-pressure combustion products can flow. The turbine shroud assembly 22 includes a turbine outer case 24, a blade track segment 26 that forms the boundary with the gas path 15, a carrier assembly 28 that couples the blade track segment 26 with the turbine outer case 24, and a mounting system 30 as shown in FIG. 2. The mounting system 30 of the turbine shroud assembly 22, illustratively including bolts 98, is configured to radially locate the blade track segment 26 relative to the turbine outer case 24, by engaging locating surfaces on the carrier assembly 28 and blade track segment 26 as suggested in FIG. 3.

The carrier assembly 28 comprises metallic support components configured to interface with other metallic components spaced apart from the gas path. Illustratively, the carrier assembly 28 is segmented and extends circumferentially partway around the axis 11. The blade track segments 26 are ceramic matrix composite components configured to directly face the high temperatures of the gas path 15.

The turbine outer case 24 includes a forward outer case 32 and an aft outer case 34 as shown in FIG. 2. The forward outer case 32 extends axially forward and can form the outer case of forward sections of the turbine 18 and/or assemble to forward sections of the gas turbine engine 10, such as the combustor 16. The aft outer case 34 extends axially aft and can form the outer case of aft sections of the turbine 18 and/or assemble to aft sections of the turbine 18, such as a low pressure turbine section.

Figure 3:
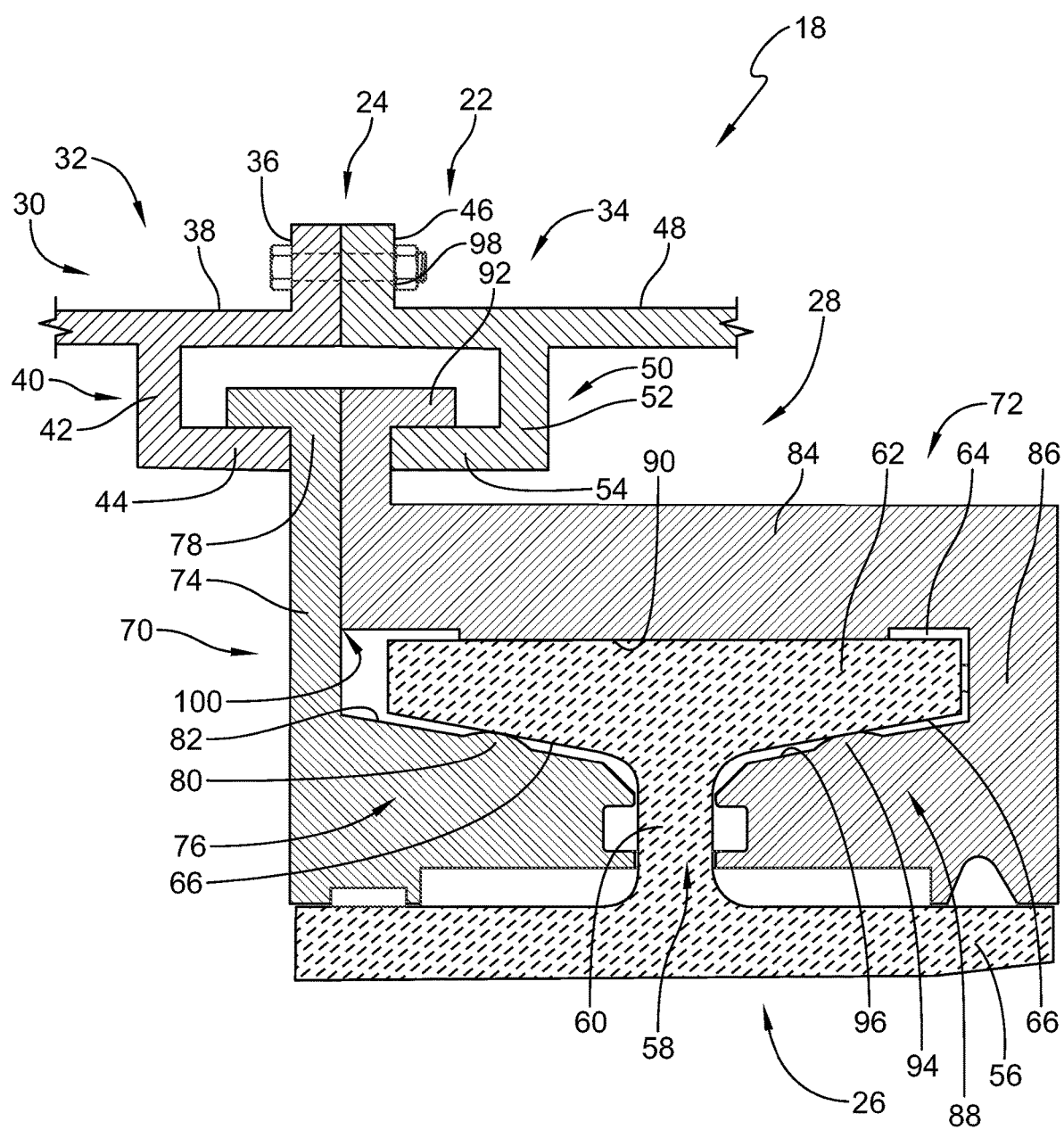
FIG. 3 is a detailed view of a portion of FIG. 2 showing that the forward and aft carrier segments assemble axially toward each other so that angled surfaces of the carrier segments push the dovetail attachment feature radially outward against a locating pad on the aft carrier segment to radially position the blade track relative to the carrier assembly, and further showing the forward and aft carrier segments include L-shaped mounts to couple with L-shaped hangers extending inward from a turbine outer case.

The forward outer case 32 includes a mount flange 36, an outer wall 38, and a forward hanger 40 that engages with the carrier assembly 28 as shown in FIGS. 2 and 3. The mount flange 36 extends radially outward from an aft terminating end of the outer wall 38. The outer wall 38 extends axially forward from the mount flange 36 and extends circumferentially around the engine axis 11 to form a full hoop. The forward hanger 40 extends radially inward from the outer wall 38 and includes a radially extending portion 42 and an axially extending portion 44. The axially extending portion 44 extends axially aft from the radially extending portion 42 and engages with the carrier assembly 28 to support the carrier assembly 28 relative to the axis 11.

The aft outer case 34 includes a mount flange 46, an outer wall 48, and an aft hanger 50 that engages with the carrier assembly 28 as shown in FIGS. 2 and 3. The mount flange 46 extends radially outward from a forward terminating end of the outer wall 48. The outer wall 48 extends axially aft from the mount flange 46 and extends circumferentially around the engine axis 11 to form a full hoop. The aft hanger 50 extends radially inward from the outer wall 48 and includes a radially extending portion 52 and an axially extending portion 54. The axially extending portion 54 extends axially forward from the radially extending portion 52 and engages with the carrier assembly 28 to support the carrier assembly 28 relative to the axis 11.

Figure 4:
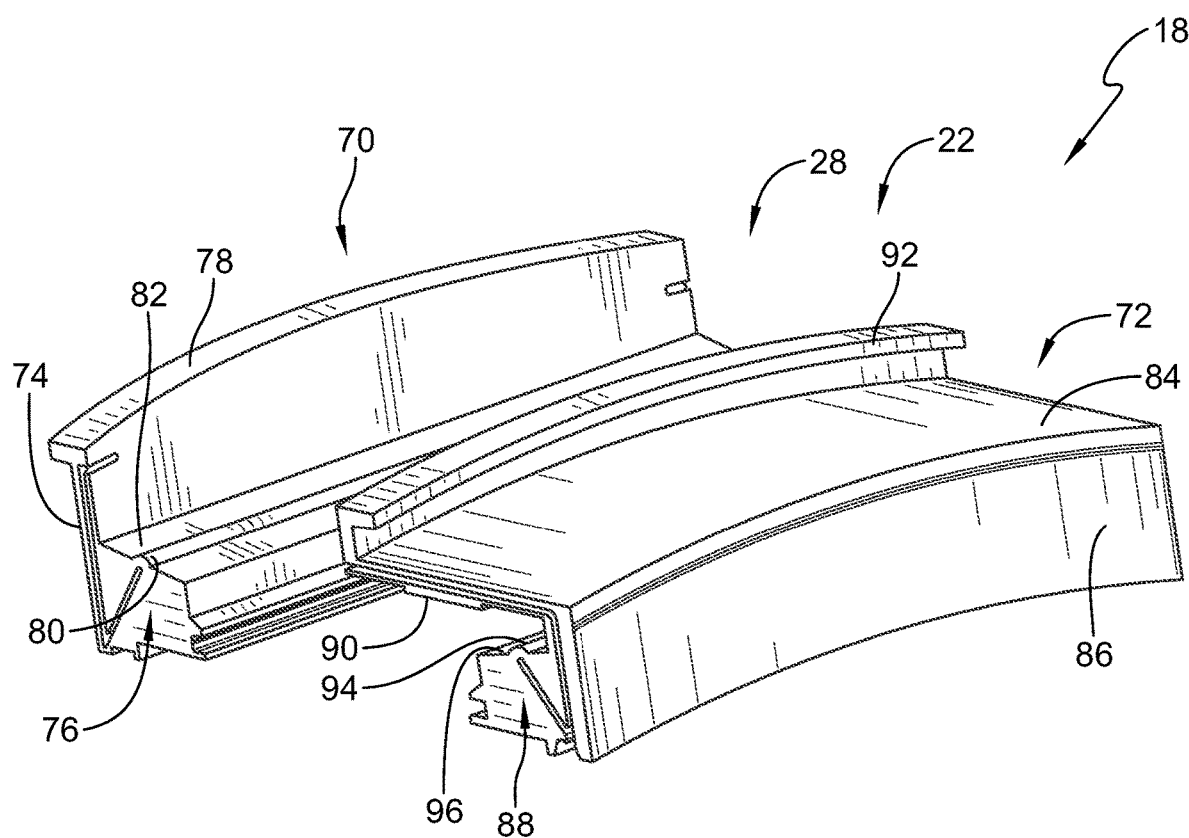
FIG. 4 is an exploded perspective view of the turbine shroud assembly of FIG. 3.
Figure 4:
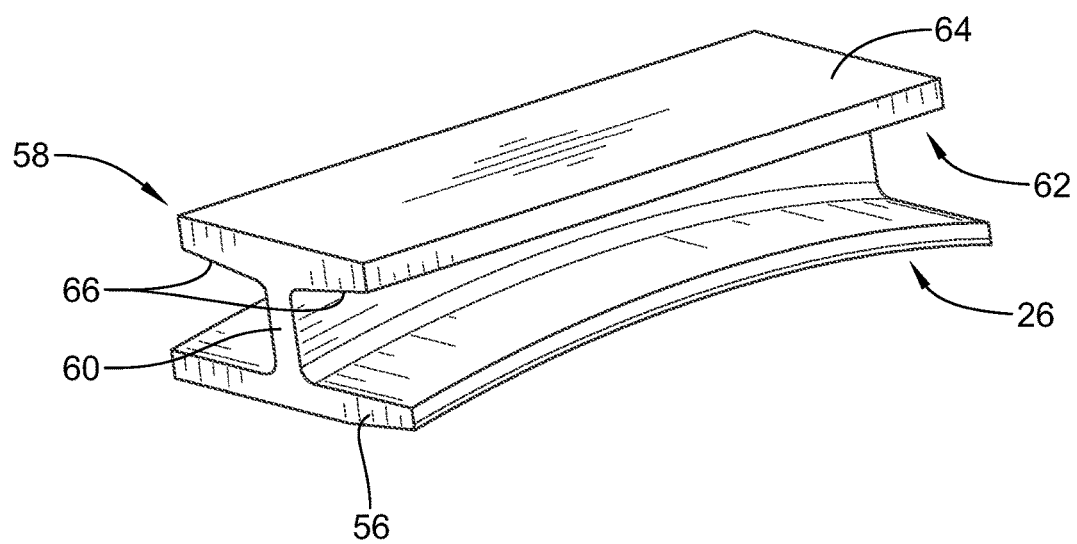

Each blade track segment 26 extends circumferentially partway around the engine axis 11 and forms the outer surface of the gas path 15 as shown in FIGS. 2 and 3. The blade track segment 26 includes a runner 56 and a dovetail attachment feature 58 as shown in FIGS. 3 and 4. The runner 56 is arcuate and extends circumferential partway around the engine axis 11 and extends a limited axial distance across the engine axis 11. The dovetail attachment feature 58 extends radially outward from the runner 56 to provide structure for coupling the blade track segment 26 to the carrier assembly 28.

The dovetail attachment feature 58 includes a stem 60 that extends radially outward from the runner 56 and a head 62 that is linear and has a dovetail shape cross-section as shown in FIGS. 3 and 4. The attachment feature 58 extends circumferentially across the runner 56 of the blade track segment 26. The head 62 includes a locating surface 64 on the outer portion and load retainer surfaces 66 on the angled inner portions of the dovetail shape. Both the locating surfaces 64 and load retainer surfaces 66 provide surfaces for engaging with the carrier assembly 28.

The carrier assembly 28 includes a forward carrier segment 70 and an aft carrier segment 72 positioned axially aft of the forward carrier segment 70 as shown in FIG. 3. The forward carrier segment 70 engages the forward hanger 40 of the forward outer case 32 and assembles around the forward portion of the dovetail attachment feature 58. The aft carrier segment 72 engages the aft hanger 50 of the aft outer case 34 and assembles around the outer portion and aft portion of the dovetail attachment feature 58.

The forward carrier segment 70 includes a radially extending flange 74 and a forward load carrying portion 76 that extends axially aft from a radially inward portion of the radially extending flange 74 as shown in FIG. 3. The radially extending flange 74 has a hook feature 78 at the radially outward terminating end that extends axially forward to engage with the axial extending portion 44 of the forward hanger 40 of the turbine outer case 24. The hook feature 78 is axially shorter that the axial extending portion 44 to allow the aft terminating end of the axial extending portion 44 to engage the radially extending flange 74 during assembly and support the radially extending flange 74 relative to the axis 11. The radially extending flange 74 extends radially inward towards the runner 56 of the blade track segment 26 and maintains a small gap therebetween.

The forward load carrying portion 76 extends axially aft from the radially extending flange 74 and locates radially inward of the forward portion of the head 62 and radially outward of the runner 56 as shown in FIG. 3. The forward load carrying portion 76 includes a forward load pad 80 and a forward retainer surface 82 that are both linear and face toward the forward load retainer surface 66 of the dovetail attachment feature 58. The forward load pad 80 extends outward perpendicularly from the forward retainer surface 82 and engages with the load retainer surface 66 of the dovetail attachment feature 58. In the illustrative embodiment the forward load carrying portion 76 includes seal grooves that face the stem 60 and runner 56 to discourage air flow therebetween. The illustrative seal grooves may also include rope seals to seal between the forward load carrying portion 76 and the blade track segment 26.

The aft carrier segment 72 includes an outer wall 84, an aft flange 86, and an aft load carrying portion 88 as shown in FIG. 3. The outer wall 84 is located radially outward of the head 62 and includes a locating pad 90 and a flange hook 92. The flange hook 92 extends radially outward from a forward terminating end of the outer wall 84 then axially aft to engage with the axial extending portion 54 of the aft hanger 50 of the turbine outer case 24. The axial extending portion of the flange hook 92 is axially shorter that the axial extending portion 54 to allow the forward terminating end of the axial extending portion 54 to engage an aft axial face of the flange hook 92 during assembly. The locating pad 90 is located on the radially inner surface the outer wall 84. The outer wall 84 can be arcuate in the illustrative embodiment but could be linear in a further embodiment. The locating pad 90 engages the locating surface 64 of the blade track segment 26 during assembly to radially locate the blade track segment 26 relative to the carrier assembly 28. In the illustrative embodiment, the locating pad 90 and locating surface 64 provide a flat-to-flat contact also considered linear or planar contact.

In another embodiment, the forward carrier segment 70 may include a forward outer wall and a forward flange. The forward outer wall may extend axially forward from the radially extending flange 74. The forward outer wall may include the locating pad 90 that engages locating surface 64 of the blade track segment 26. The forward flange may extend radially inward from a forward terminating end of the forward outer wall, and the forward load carrying portion 76 may extend axially aft from a radially inner end of the forward flange.

The aft flange 86 extends radially inward from the aft terminating end of the outer wall 84 toward the runner 56 of the blade track segment 26 and maintains a small gap therebetween as shown in FIG. 3. The aft load carrying portion 88 extends axially forward from the aft flange 86 and locates radially inward of the aft portion of the head 62 and radially outward of the runner 56 as shown in FIG. 3. The aft load carrying portion 88 includes an aft load pad 94 and an aft retainer surface 96 that are both linear and face toward the aft load retainer surface 66 of the dovetail attachment feature 58. The aft load pad 94 extends outward perpendicularly from the aft retainer surface 96 and engages with the load retainer surface 66 of the dovetail attachment feature 58. In the illustrative embodiment the aft load carrying portion 88 includes seal grooves that face the stem 60 and runner 56 to discourage air flow therebetween. The illustrative seal grooves may also include rope seals to seal between the aft load carrying portion 88 and the blade track segment 26.

The mounting system 30 includes assembly bolts 98 and an assembly gap 100 that closes during assembly to bias the locating surface 64 of the blade track segment 26 into engagement with the locating pad 90 of the aft carrier segment 72 of the carrier assembly 28. Prior to clamping of the turbine shroud assembly 22 the assembly gap 100 is present between the hook feature 78 and the flange hook 92 and extends radially inward between the forward carrier segment 70 and the aft carrier segment 72. The assembly bolts 98 clamp the mount flanges 36, 46 of the turbine outer case 24 together. The clamping causes the aft end of the axial extending portion 44 of the forward hanger 40 to push the radial extending flange 74 of the forward carrier segment 70 aft. The clamping also causes the forward end of the axial extending portion 54 of the aft hanger 50 to push the flange hook 92 of the aft carrier segment 72 forward.

The assembly gap 100 allows the forward carrier segment 70 and the aft carrier segment 72 to translate towards each other. As the forward carrier segment 70 moves axially aft, the forward load carrying portion 76 and forward load pad 80 also translate axially aft and pushes on the load retainer surface 66 of the dovetail attachment feature 58. At the same time, the aft carrier segment 72 translates axially forward and the aft load carrying portion 88 and the aft load pads 94 translate forward to push on the load retainer surface 66 of the attachment feature 58. The axially aft movement of the forward load pads 80 on the angled load retainer surface 66, and the axially forward movement of the aft load pads 94 on the aft portion of the load retainer surface 66 bias the head 62 of the dovetail attachment feature 58 radially outward. The assembly gap 100 continues to close until the locating surface 64 of the dovetail attachment feature 58 engages the locating pad 90 of the aft carrier segment 72. The assembly gap 100 is sized so that there is an axial gap present after the locating surface 64 has engaged the locating pad 90. In an alternative embodiment the assembly gap 100 is replaced by compression in the material of the forward carrier segment 70 and aft carrier segment 72.

Figure 5:
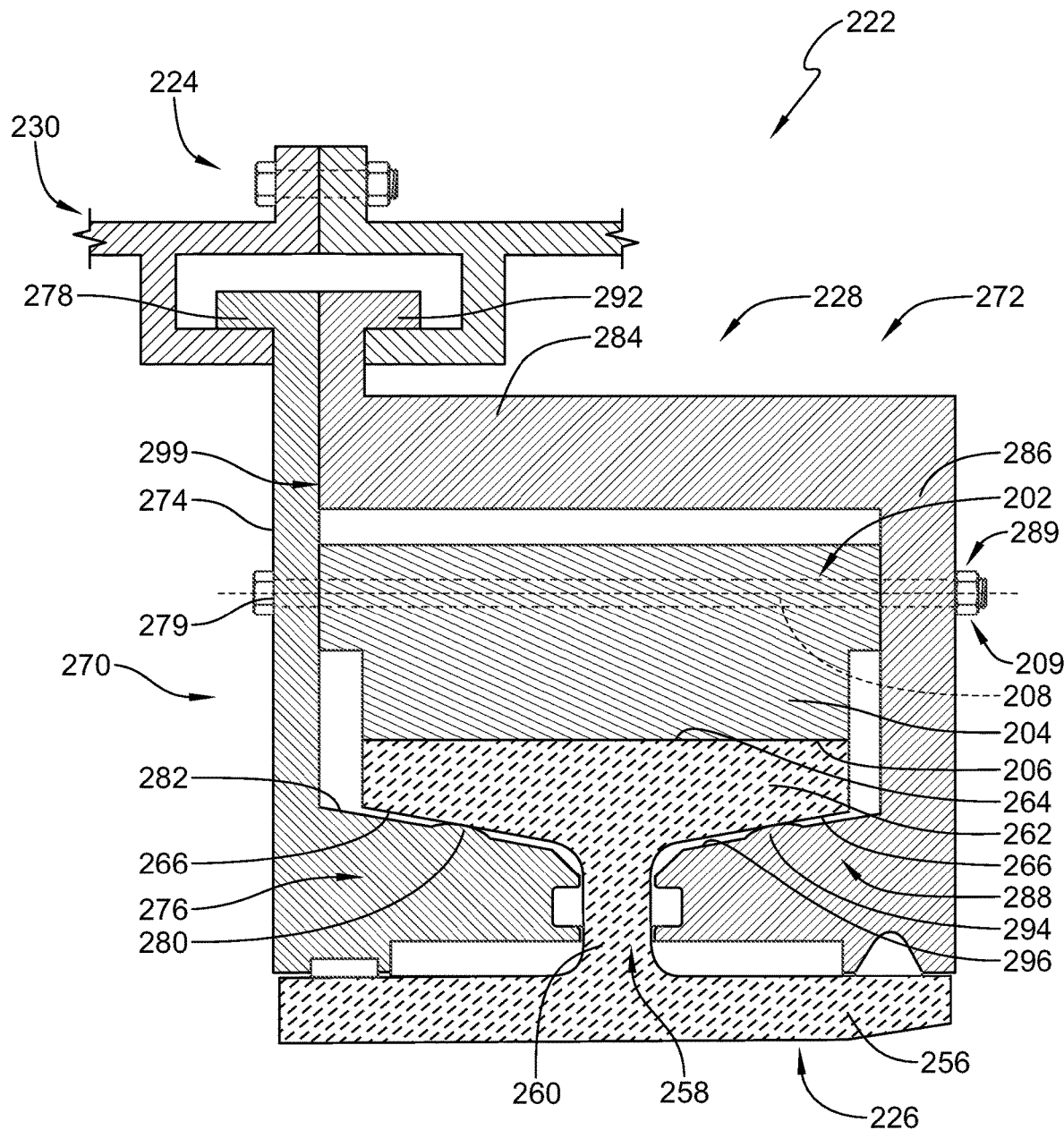
FIG. 5 is a detailed view of a second turbine shroud assembly with a similar forward and aft carrier arrangement as the turbine shroud of FIG. 3 showing that the second turbine shroud assembly includes a locating spacer, located between the forward and aft carrier segments, that radially positions the blade track segment relative to the carrier assembly.

Another embodiment of a turbine shroud assembly 222 in accordance with the present disclosure is shown in FIG. 5. The turbine shroud assembly 222 is substantially similar to the turbine shroud assembly 22 shown in FIGS. 1-4 and described herein. Accordingly, similar reference numbers in the 200 series indicate features that are common between the turbine shroud assembly 222 and the turbine shroud assembly 22. The description of the turbine shroud assembly 22 is incorporated by reference to apply to the turbine shroud assembly 222, except in instances when it conflicts with the specific description and the drawings of the turbine shroud assembly 222.

Figure 6:
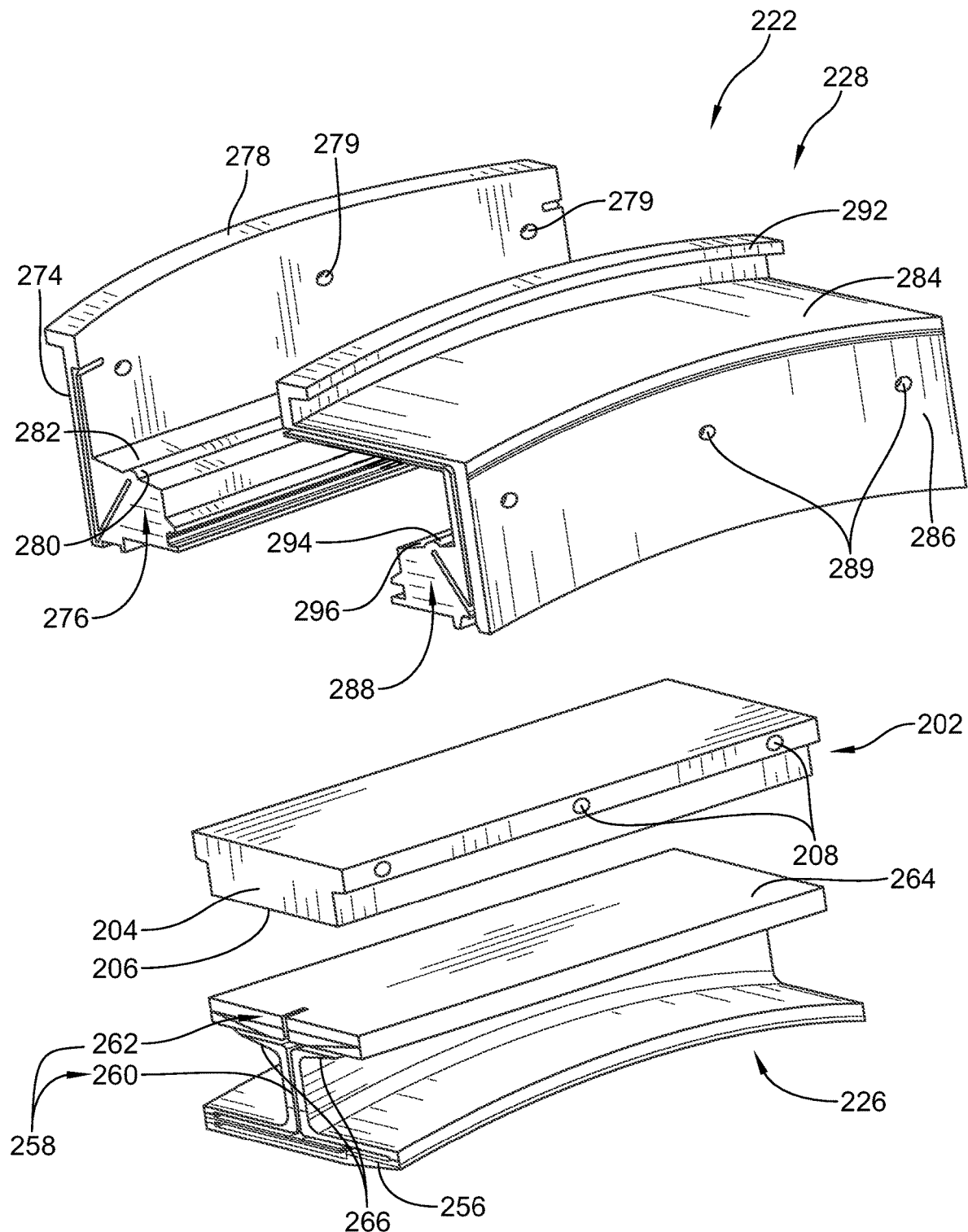
FIG. 6 is an exploded perspective view of the turbine shroud assembly of FIG. 5.

The turbine shroud assembly 222 includes a turbine outer case 224, a blade track segment 226, a carrier assembly 228, a mounting system 230, and a locating spacer 202 as shown in FIGS. 5 and 6. The blade track segment 226 includes a runner 256 and a dovetail attachment feature 258. The dovetail attachment feature 258 includes a stem 260 and a head 262. The head 262 includes a locating surface 264 on the outer portion and load retainer surfaces 266 on the angled inner portions of the dovetail shape.

The carrier assembly 228 includes a forward carrier segment 270 and an aft carrier segment 272 as shown in FIGS. 5 and 6. The forward carrier segment 270 includes a radially extending flange 274 and a forward load carrying portion 276 that extends axially aft from a radially inward portion of the radially extending flange 274 as shown in FIG. 5. The radially extending flange 274 has a hook feature 278 at the radially outward terminating end that engages with a corresponding feature of the turbine outer case 224. The radially extending flange 274 extends radially inward towards the runner 256 of the blade track segment 226 and maintains a small gap therebetween. The radially extending flange 274 further includes locating spacer assembly holes 279 that extend axially through the radially extending flange 274. The forward load carrying portion 276 extends axially aft from the radially extending flange 274 and locates radially inward of the forward portion of the head 262 and radially outward of the runner 256 as shown in FIG. 5. The forward load carrying portion 276 includes a forward load pad 280 and a forward retainer surface 282.

The aft carrier segment 272 includes an outer wall 284, an aft flange 286, and an aft load carrying portion 288 as shown in FIG. 5. The outer wall 284 is located radially outward of the locating spacer 202 and includes a flange hook 292 that extends radially outward from a forward terminating end of the outer wall 284. The flange hook 292 engages with the corresponding feature of the turbine outer case 224. The aft flange 286 extends radially inward from the aft terminating end of the outer wall 284 toward the runner 256 and maintains a small gap therebetween. The aft flange 286 further includes locating spacer assembly holes 289 that extend axially through the aft flange 286. The aft load carrying portion 288 extends axially forward from the aft flange 286 and locates radially inward of the aft portion of the head 262 and radially outward of the runner 256. The aft load carrying portion 288 includes an aft load pad 294 and an aft retainer surface 296.

The locating spacer 202 is located axially aft of the forward carrier segment 270 and axially forward of the aft flange 286 of the aft carrier segment 272 as shown in FIG. 5. The locating spacer 202 is further located radially outward of the dovetail attachment feature 258, and radially inward of the outer wall 284 of the aft carrier segment 272 so that there is a gap between the outer wall 284 and the locating spacer 202. The locating spacer 202 has a T-shape cross section and linearly extends the length of the dovetail attachment feature 258. The locating spacer 202 includes a pad extension 204, a locating pad 206 and assembly holes 208 that align with the locating spacer assembly holes 279, 289 in the forward and aft carrier segments 270, 272.

Locating spacer bolts 209 extend through the forward locating spacer assembly holes 279, the assembly holes 208, and the aft locating spacer holes 289 to radially position the locating spacer relative to the carrier assembly 228. The locating pad 206 is positioned on the radially inward portion of the pad extension 204 and faces the locating surface 264 of the dovetail attachment feature 258. The locating pad 206 engages the locating surface 264 of the blade track segment 226 during assembly to radially locate the blade track segment 226 relative to the carrier assembly 228.

The mounting system 230 includes a radial assembly gap 299 between hook feature 278 of the forward carrier segment 270 and the flange hook 292 of the aft carrier segment 272. The assembly gap 299 closes during assembly to bias the locating surface 264 of the blade track segment 226 into engagement with the locating pad 206 of the locating spacer 202. The assembly gap 299 allows the forward carrier segment 270 and the aft carrier segment 272 to translate towards each other. As the forward carrier segment 270 moves axially aft, and the aft carrier segment 272 moves axially forward, the load pads 280, 294 bias against the load retainer surfaces 266 to cause the head 262 of the dovetail attachment feature 258 to translate radially outward. The assembly gap 299 continues to close until the locating surface 264 of the dovetail attachment feature 258 engages the locating pad 206 of the locating spacer 202. In one embodiment the assembly gap 299 is replaced by compression in the material of the locating spacer 202.

Figure 7:
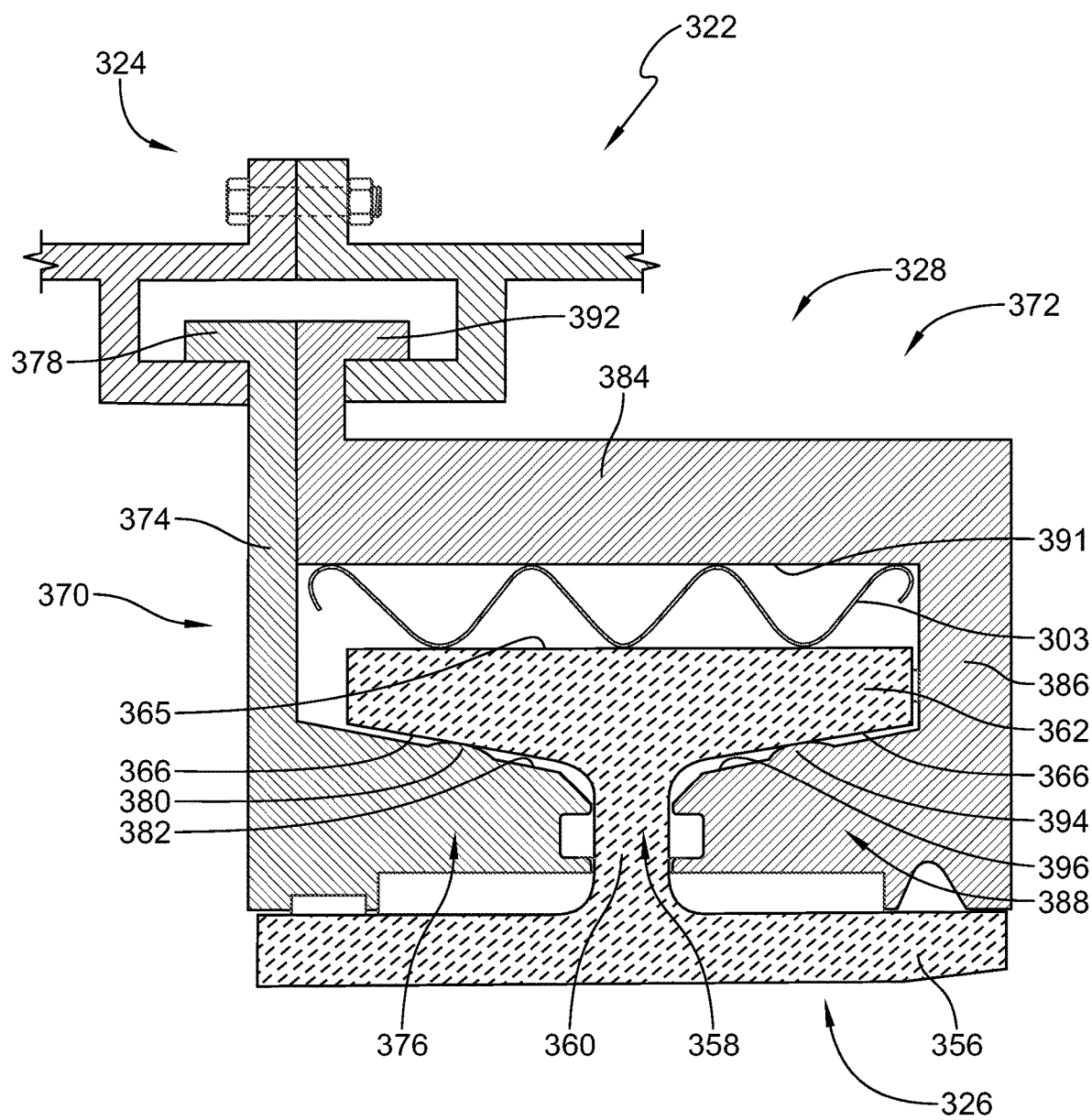
FIG. 7 is a detailed view of a third turbine shroud assembly showing a spring that biases a blade track segment towards locating pads on the forward and aft carrier segments, and further showing the locating pads radially position the blade track segment relative to the carrier assembly.

Another embodiment of a turbine shroud assembly 322 in accordance with the present disclosure is shown in FIG. 7. The turbine shroud assembly 322 is substantially similar to the turbine shroud assembly 22 shown in FIGS. 1-4 and described herein. Accordingly, similar reference numbers in the 300 series indicate features that are common between the turbine shroud assembly 322 and the turbine shroud assembly 22. The description of the turbine shroud assembly 22 is incorporated by reference to apply to the turbine shroud assembly 322, except in instances when it conflicts with the specific description and the drawings of the turbine shroud assembly 322.

Figure 8:
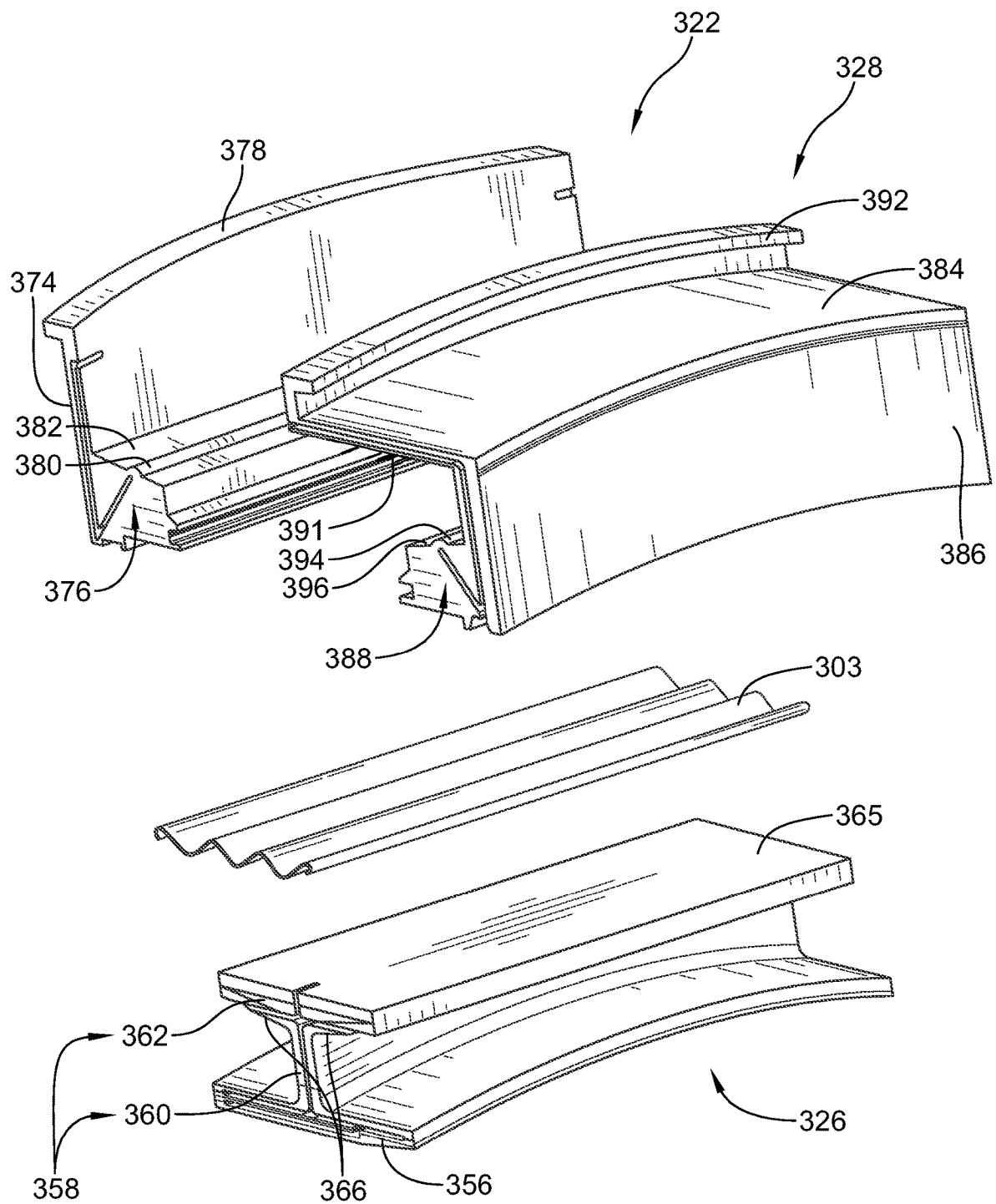
FIG. 8 is an exploded perspective view of the turbine shroud assembly of FIG. 7 suggesting that the spring contains a plurality of radial undulations as the spring extends in the axial direction.

The turbine shroud assembly 322 includes a turbine outer case 324, a blade track segment 326, a carrier assembly 328, and a bias member 303 as shown in FIGS. 7 and 8. The blade track segment 326 includes a runner 356 and a dovetail attachment feature 358. The dovetail attachment feature 358 includes a stem 360 and a head 362. The head 362 includes an outer surface 365 on the outer portion and locating load surfaces 366 on the angled inner portions of the dovetail shape.

The carrier assembly 328 includes a forward carrier segment 370 and an aft carrier segment 372 as shown in FIGS. 7 and 8. The forward carrier segment 370 includes a radially extending flange 374 and a forward load carrying portion 376 that extends axially aft from a radially inward portion of the radially extending flange 374 as shown in FIG. 7. The radially extending flange 374 has a hook feature 378 at the radially outward terminating end that engages with a corresponding feature of the turbine outer case 324. The radially extending flange 374 extends radially inward towards the runner 356 of the blade track segment 326 and maintains a small gap therebetween. The forward load carrying portion 376 extends axially aft from the radially extending flange 374 and locates radially inward of the forward portion of the head 362 and radially outward of the runner 356. The forward load carrying portion 376 includes a linear forward locating load pad 380 and a linear forward retainer surface 382.

The aft carrier segment 372 includes an outer wall 384, an aft flange 386, and an aft load carrying portion 388 as shown in FIG. 7. The outer wall 384 includes an inner surface 391 and a flange hook 392 that extends radially outward from a forward terminating end of the outer wall 384. The flange hook 392 engages with the corresponding feature of the turbine outer case 324. The aft flange 386 extends radially inward from the aft terminating end of the outer wall 384 toward the runner 356 and maintains a gap therebetween. The aft load carrying portion 388 extends axially forward from the aft flange 386 and locates radially inward of the aft portion of the head 362 and radially outward of the runner 356. The aft load carrying portion 388 includes a linear aft locating load pad 394 and a linear aft retainer surface 396.

Illustratively, the bias member 303 is a spring 303 located axially aft of the forward carrier segment 370 and axially forward of the aft flange 386 of the aft carrier segment 372 as shown in FIG. 7. The spring 303 is further located radially outward of the dovetail attachment feature 358, and radially inward of the inner surface 391 of the aft carrier segment 372. The spring 303 engages with both the surface 365 of the dovetail attachment feature 358 and the inner surface 391 of the aft carrier segment 372. The spring 303 has a plurality of undulations in the axial direction and extends circumferentially the length of the dovetail attachment feature 358 in a liner fashion. The spring 303 biases the dovetail attachment feature 358 radially inward so that the locating load surfaces 366 of the dovetail attachment feature 358 engage with the forward and aft locating load pads 380, 394 of the forward and aft carrier segments 370, 372. The forward and aft locating load pads 380, 394 radially locate the blade track segment 326 relative to the carrier assembly 328.

Figure 9:
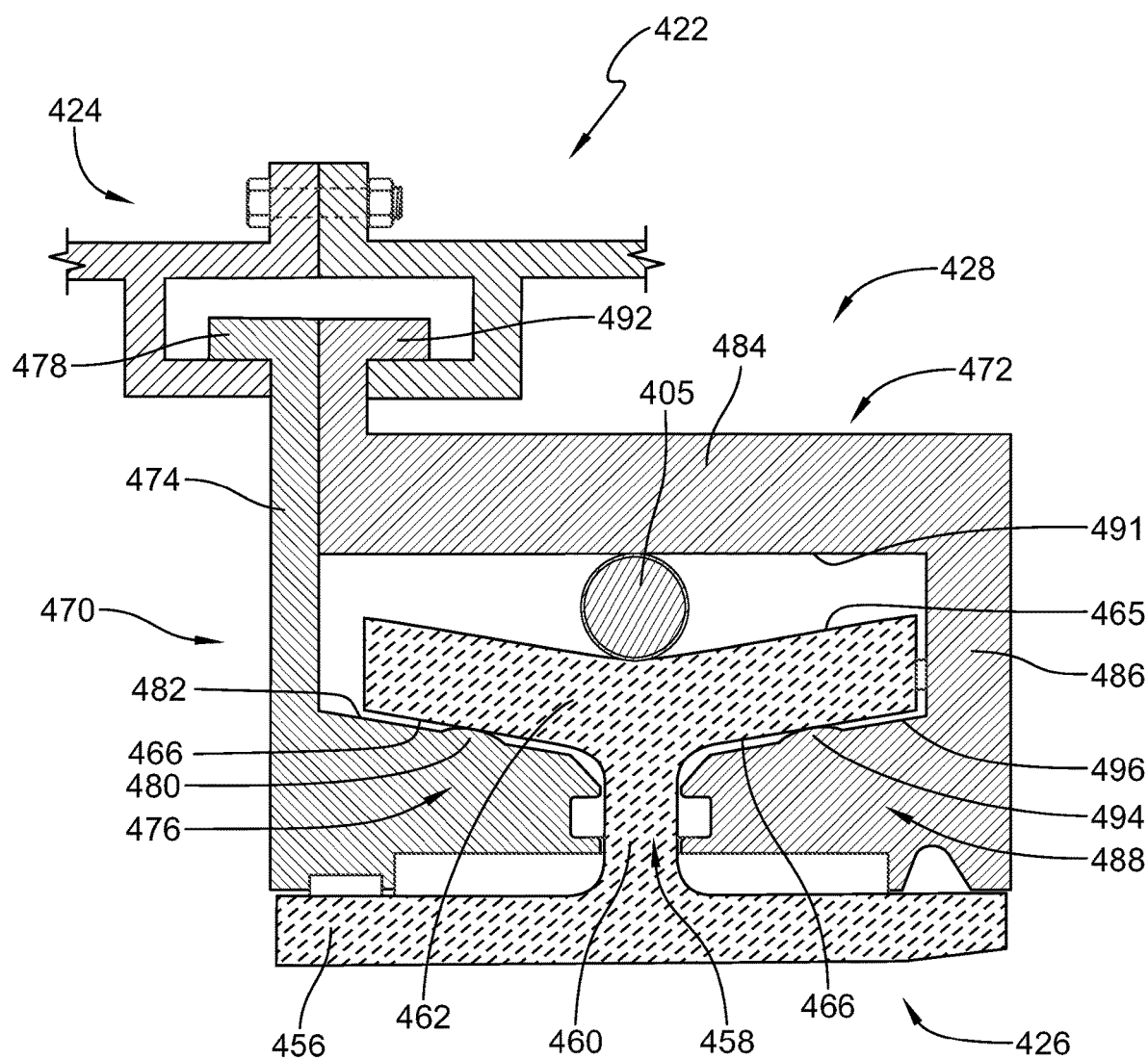
FIG. 9 is a detailed view of a fourth turbine shroud assembly showing a rope seal that biases a blade track segment towards locating pads on forward and aft carrier segments, and further showing that a dovetail attachment feature of the blade track segment has a shallow V-shape to locate the rope seal centrally on the attachment feature.

Another embodiment of a turbine shroud assembly 422 in accordance with the present disclosure is shown in FIG. 9. The turbine shroud assembly 422 is substantially similar to the turbine shroud assembly 22 shown in FIGS. 1-4 and described herein. Accordingly, similar reference numbers in the 400 series indicate features that are common between the turbine shroud assembly 422 and the turbine shroud assembly 22. The description of the turbine shroud assembly 22 is incorporated by reference to apply to the turbine shroud assembly 422, except in instances when it conflicts with the specific description and the drawings of the turbine shroud assembly 422.

Figure 10:
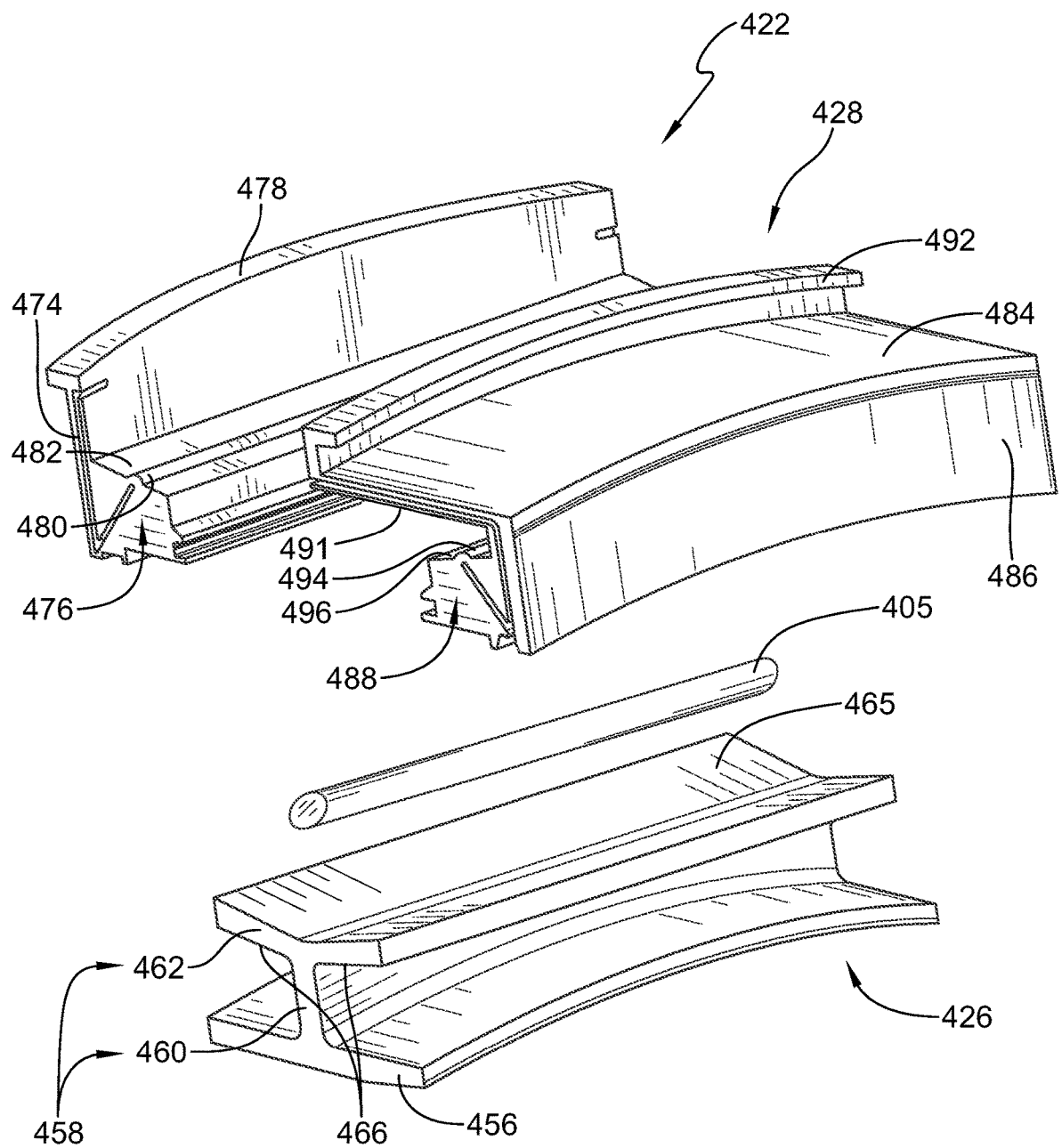
FIG. 10 is an exploded perspective view of the turbine shroud assembly of FIG. 9 suggesting the radially outward shallow V-shape surface of the attachment feature of the blade track segment has a linear extending crease that the rope seal nests within when assembled.

The turbine shroud assembly 422 includes a turbine outer case 424, a blade track segment 426, a carrier assembly 428, and a rope seal 405 as shown in FIGS. 9 and 10. The blade track segment 426 includes a runner 456 and a dovetail attachment feature 458. The dovetail attachment feature 458 includes a stem 460 and a head 462. The head 462 includes an outer v-shaped surface 465 on the outer portion and locating load surfaces 466 on the angled inner portions of the dovetail shape. Forward and aft faces of the outer v-shaped surface 465 converge radially inward toward one another and meet to provide the v-shape.

The carrier assembly 428 includes a forward carrier segment 470 and an aft carrier segment 472 as shown in FIGS. 9 and 10. The forward carrier segment 470 includes a radially extending flange 474 and a forward load carrying portion 476 that extends axially aft from a radially inward portion of the radially extending flange 474 as shown in FIG. 9. The radially extending flange 474 has a hook feature 478 at the radially outward terminating end that engages with a corresponding feature of the turbine outer case 424. The radially extending flange 474 extends radially inward towards the runner 456 of the blade track segment 426 and maintains a small gap therebetween. The forward load carrying portion 476 extends axially aft from the radially extending flange 474 and locates radially inward of the forward portion of the head 462 and radially outward of the runner 456. The forward load carrying portion 476 includes a linear forward locating load pad 480 and a linear forward retainer surface 482.

The aft carrier segment 472 includes an outer wall 484, an aft flange 486, and an aft load carrying portion 488 as shown in FIG. 9. The outer wall 484 includes an inner surface 491 and a flange hook 492 that extends radially outward from a forward terminating end of the outer wall 484. The flange hook 492 engages with the corresponding feature of the turbine outer case 424. The aft flange 486 extends radially inward from the aft terminating end of the outer wall 484 toward the runner 456 and maintains a gap therebetween. The aft load carrying portion 488 extends axially forward from the aft flange 486 and locates radially inward of the aft portion of the head 462 and radially outward of the runner 456. The aft load carrying portion 488 includes a linear aft locating load pad 494 and a linear aft retainer surface 496.

The rope seal 405 is located radially outward of the v-shaped outer surface 465 of the dovetail attachment feature 458 and radially inward of the inner surface 491 of the aft carrier segment 472. The rope seal 405 is positioned in the groove of the "v" of the v-shaped outer surface 465. The rope seal 405 engages with both the v-shaped surface 465 and inner surface 491 of the aft carrier segment 472. The rope seal 405 extends the length of the dovetail attachment feature 458 and comprises a compressible material. The rope seal 405 provides a seal between the blades track segment 426 and the carrier assembly 428 and biases the dovetail attachment feature 458 radially inward so that the locating load surfaces 466 of the dovetail attachment feature 458 engage with the forward and aft locating load pads 480, 494 of the carrier assembly 428. The forward and aft locating load pads 480, 494 radially locate the blade track segment 426 relative to the carrier assembly 428.

The present disclosure provides a design for a linear dovetail CMC blade track segment 26 and the carrier assembly 28 that supports it. The blade track segment 26 may be supported and radially located by linear load pads 80, 94 on the carrier assembly 28 that may remain in the same position throughout the operating envelope. The load pads 80, 94 on the carrier assembly 28 may also act as chordal seals; with the appropriate circumferential sealing arrangement, these features could be the primary seals between internal cavities.

In the illustrative embodiment, the blade track segment 26 may have a circumferentially linear (in path as opposed to curving circumferentially about the axis) dovetail attachment feature 58 that may assemble between a forward carrier segment 70 and an aft carrier segment 72 as shown in FIG. 3. The two carriers 70, 72 may each have a circumferentially linear 'bump' or load pad 80, 94 which the head 62 of the blade track segment 26 would contact. The forward carrier segment 70 may have a forward facing hook feature 78 and the aft carrier segment 72 may have a rearward facing flange hook 92 to interface with corresponding hangers 40, 50 of the turbine outer case 24. The forward and aft outer cases 32, 34 of the turbine outer case 24 would each have a mount 36, 46 through which they may be bolted together. As the mounts 36, 46 of the turbine outer case 24 are brought together, the hooks 78, 92 would also come together. The assembly bolt 98 would be tightened such that the hooks 36, 46 may be over-compressed together and are not separated during engine operation (i.e. the over-compression distance may be greater than the thermal growth separation distance).

As the carriers 70, 72 are blocked from moving relative to one another during engine operation, the load pads 80, 94 on which the seal segment is radially located may also not move. The aft carrier segment 72 presses radially downward on the blade track segment 26, putting the head 62 of the blade track segment 26 in compression, under which the CMC material typically performs well. The blade track segment 26 could be manufactured via 2D layups or 3D weaving.

Bending introduced due to the asymmetric pressure loading across the blade track segment 26 can be disassociated from the stresses induced by the load pads 80, 94. This approach may allow for a generous radius at the retainer surfaces 96, 82 to minimize stress concentrations in this feature without interfering with packaging. Additionally, as the CMC blade track segment 26 and carrier assembly 28 will have different coefficients of thermal expansion, the dovetail angle in the blade track segment 26 and the assembly bolt torque may be tailored for different operating conditions to ensure the carriers never separate.

Anti-rotation options include, but are not limited to, radial anti-rotation pins engaged in a slot on the dovetail attachment feature 58 or on the locating surface 64 of the blade track segment 26; a feature (such as a tab) on the carrier assembly 28 end to restrain movement; a feature on the circumferentially adjacent carrier assembly 28 or blade track segment 26; or an axial pin that fits into a groove on the blade track segment 26.

A further embodiment may allow for a locating spacer 202 to compress radially against the blade track segment 226 instead of the aft carrier segment 272. The locating spacer 202 may be bolted between the forward and aft carrier segments 270, 272. The carrier segments 270, 272 would be attached to the turbine outer case 224 in the same fashion as in the primary embodiment as shown in FIG. 5. Alternatively, the hooks 278, 292 of the carrier assembly 228 could be spread apart axially to allow room for the locating spacer 202 between them at a more radially outboard position. This may reduce the radial space claim.

Another embodiment may use a bias member 303 to provide compression against the outer surface 365 of the blade track segment 326 as shown in FIG. 7. The bias member 303 may be a spring 303 that sits between the aft carrier segment 372 and the CMC blade track segment 326. The spring 303 would replace the compression from the aft carrier segment 72 or locating spacer 202 while putting less load onto the CMC blade track segment 326, reducing the potential for damage to the component. The spring 303 could be a leaf or wave type or similar, and be made of sheet metal.

A further embodiment may use a braid seal or rope seal 405 as shown in FIG. 9. The rope seal 405 may be positioned between the aft carrier segment 472 and the blade track segment 426. The rope seal 405 may only provide compression at the center of the v-shaped outer surface 465 of the CMC blade track segment 426 instead of along the entire surface. This could reduce the load on the seal segment and reduce the potential for damage in the component. In this configuration, the head 462 of the blade track segment 426 would be angled upwards. This may help to retain/capture the rope seal 405 and could be easier to manufacture via 2D layups than the other designs.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly for use with a gas turbine engine, the turbine shroud assembly comprising
   a turbine outer case arranged circumferentially around an axis,
   a blade track segment including an arcuate runner that extends circumferentially partway around the axis to define a gas path boundary of the turbine shroud assembly and an attachment feature that extends radially outward from the runner, the attachment feature includes radially inward facing and angled load surfaces and a radially outward facing locating surface,
   a carrier assembly configured to couple the blade track segment to the turbine outer case, the carrier assembly including a first carrier segment shaped to have (i) a first radially-extending flange that extends radially inwardly from the turbine outer case and (ii) a first load carrying portion that engages a first one of the radially inwardly facing and angled load surfaces provided by the attachment feature included in the blade track segment and a second carrier segment shaped to have (i) a second radially-extending flange that extends radially inwardly from the turbine outer case and (ii) a second load carrying portion that engages a second one of the radially inwardly facing and angled load surfaces provided by the attachment feature included in the blade track segment, and
   a locating spacer that includes an inwardly facing locating pad that engages the locating surface of the attachment feature to radially locate the blade track segment.

2. The turbine shroud assembly of claim 1, wherein the radially inward facing and angled load surfaces extend axially and radially relative to the axis so as to form a dovetail shape when viewed circumferentially about the axis.

3. The turbine shroud assembly of claim 2, wherein the first load carrying portion includes a main boom that extends from the first radially-extending flange and at least one load pad that extends from the main boom into engagement with the load surfaces of the attachment feature.

4. The turbine shroud assembly of claim 1, wherein the turbine outer case includes a forward hanger that engages the forward extending flange to push the first carrier segment axially aft and an aft hanger that engages the forward flange of the second carrier segment to push the second carrier segment axially forward and wherein an axial assembly gap between the first carrier segment and the second carrier segment is closed upon assembly.

5. The turbine shroud assembly of claim 1, wherein the locating spacer is coupled to the forward extending flange of the first carrier segment and the aft flange of the second carrier segment.

6. A turbine shroud assembly for use with a gas turbine engine, the turbine shroud assembly comprising
   a turbine outer case including a forward outer case and an aft outer case, the forward outer case including a forward outer wall, a forward mount flange extending radially outward from the outer wall at an aft terminating end of the forward outer wall, and a radially inward extended forward hanger, the aft outer case including an aft outer wall, an aft mount flange extending radially outward from the aft outer wall at a forward terminating end of the aft outer wall, and a radially inward extending aft hanger,
   a carrier assembly made of metallic material and arranged circumferentially around an axis, the carrier assembly comprising a forward carrier segment and an aft carrier segment, the forward carrier segment including a forward radially extending flange that couples with the forward hanger and a forward load carrying portion that extends axially aft from an inner end of the forward extending flange, the aft carrier segment including a forward flange that couples with the aft hanger, an outer wall that extends axially aft from the forward flange, an aft flange that extends radially inward from an aft end of the outer wall, and an aft load carrying portion that extends axially forward from an inner end of the aft flange, and
   a blade track segment made of ceramic matrix composite materials, the blade track segment including an arcuate runner that extends circumferentially partway around an axis to define a gas path boundary of the turbine shroud assembly and an attachment feature that extends radially outward from the runner to couple with the carrier assembly, the attachment feature includes radially inward facing and angled load surfaces that engage the forward load carrying portion of the forward carrier segment and the aft load carrying portion of the aft carrier segment, and a radially outward facing locating surface, wherein the forward carrier segment and the aft carrier segment urge the angled load surfaces to be pushed radially outward by the forward and aft load carrying portions, resulting in the locating surface of the attachment feature to bias towards the outer wall of the aft carrier segment thereby radially locating the blade track segment relative to the carrier assembly, and the forward carrier segment and the aft carrier segment are clamped together in compression so that the blade track segment does not move radially relative to the axis in response to thermal growth of the turbine shroud assembly.

7. The turbine shroud assembly of claim 6, wherein the aft carrier segment includes a locating pad that extends radially inward from the outer wall and engages the locating surface of the attachment feature, and the locating pad of the aft carrier segment and the locating surface of the attachment feature are linear surfaces tangential to the axis.

8. The turbine shroud assembly of claim 6, wherein the forward load carrying portion includes forward load pads, the aft load carrying portion includes aft load pads, and the forward load pads and aft load pads engage the load surfaces of the attachment feature.

9. The turbine shroud assembly of claim 6, wherein the forward hanger engages the forward extending flange to push the forward carrier segment axially aft and the aft hanger engages the forward flange of the aft carrier segment to push the aft carrier segment axially forward such that an axial assembly gap between the forward carrier segment and the aft carrier segment is closed upon assembly.

10. The turbine shroud assembly of claim 6, further including a locating spacer that includes an inwardly facing locating pad that engages the locating surface of the attachment feature to radially locate the blade track segment relative to the axis.

11. The turbine shroud assembly of claim 10, wherein the locating spacer is coupled to the forward extending flange of the forward carrier segment and the aft flange of the aft carrier segment.

12. The turbine shroud assembly of claim 6, further comprising a rope seal located radially between and engaging the radially outward facing locating surface and the outer wall.

13. The turbine shroud assembly of claim 6, further comprising a bias member located radially between and engaging the radially outward facing locating surface and the outer wall.

14. A method comprising
providing a turbine outer case arranged circumferentially around an axis, a blade track segment, and a carrier, the turbine outer case having a first case and a second case, the blade track segment including an arcuate runner that extends circumferentially partway around the axis and an attachment feature that extends radially outward from the runner, the attachment feature includes radially inward facing and angled load surfaces, and the carrier including a first carrier segment and a second carrier segment,
aligning the attachment feature of the blade track segment with the first carrier segment and the second carrier segment,
moving the first carrier segment and the second carrier segment relative to each other to trap the attachment feature between the first carrier segment and the second carrier segment so that load carrying portions included in the first carrier segment and the second carrier segment engage the radially inward facing and angled load surfaces of the attachment feature and move the radially inward facing and angled load surfaces radially outward,
aligning the first case and the second case with flanges of the carrier, and
moving the first case and the second case relative to each other to trap the flanges of the carrier between the first case and the second case so that the carrier is supported by the turbine outer case.

15. The method of claim 14, further comprising locating one of a spacer, bias member, and seal between the attachment feature and the second carrier segment before the step of moving the first carrier segment and the second carrier segment.

16. The method of claim 14, further comprising compressing the attachment feature radially between the first carrier segment and the second carrier segment.

\* \* \* \* \*